(12) United States Patent
Ohmiya et al.

(10) Patent No.: US 9,267,833 B2
(45) Date of Patent: Feb. 23, 2016

(54) FLUID MEASUREMENT SENSOR ATTACHMENT STRUCTURE

(75) Inventors: Junji Ohmiya, Osaka (JP); Makoto Fujii, Osaka (JP); Tomoyuki Koike, Osaka (JP)

(73) Assignee: Nippon Pillar Packing Co., Ltd., Osaka (JP)

(*) Notice: Subject to any disclaimer, the term of this patent is extended or adjusted under 35 U.S.C. 154(b) by 308 days.

(21) Appl. No.: 13/517,873

(22) Filed: Jun. 14, 2012

(65) Prior Publication Data

US 2013/0213130 A1    Aug. 22, 2013

(30) Foreign Application Priority Data

Feb. 20, 2012 (JP) .................................. 2012-34078

(51) Int. Cl.
*G01F 15/18* (2006.01)
*G01F 1/34* (2006.01)
*G01F 1/66* (2006.01)
*G01F 15/00* (2006.01)
*G01L 19/00* (2006.01)
*G01D 11/30* (2006.01)

(52) U.S. Cl.
CPC  *G01F 15/18* (2013.01); *G01F 1/34* (2013.01); *G01F 1/662* (2013.01); *G01F 1/667* (2013.01); *G01F 15/00* (2013.01); *G01L 19/0023* (2013.01); *G01D 11/30* (2013.01)

(58) Field of Classification Search
CPC ........... G01F 1/34; G01F 1/662; G01F 1/667; G01F 15/18; G01D 11/30
USPC ............. 73/201, 272 R, 273, 431, 756, 866.5
See application file for complete search history.

(56) References Cited

U.S. PATENT DOCUMENTS 4,165,654 A * 8/1979 Hammitt et al. ................. 73/723
RE33,792 E * 1/1992 Makinen ...................... 73/866.5

(Continued)

FOREIGN PATENT DOCUMENTS

JP    2-117494    9/1990
JP    4-132290    12/1992

(Continued)

OTHER PUBLICATIONS

English Translation of Tekenoshita (JP 09-166512).*

(Continued)

*Primary Examiner* — Peter Macchiarolo
*Assistant Examiner* — Alexander Mercado
(74) *Attorney, Agent, or Firm* — Renner, Otto, Boisselle & Sklar, LLP

(57) ABSTRACT

The present invention provides a fluid measurement sensor attachment structure in which a fluid measurement sensor is attached to a branch pipe among three or more branch pipes branched from a pipe, thereby measuring properties of a fluid flowing through a flow path that is formed by remaining branch pipes, comprising a sleeve that can accommodate the fluid measurement sensor, wherein the sleeve is a member in a shape of a tumbler including a circumferential wall that is substantially cylindrical and a protective wall that is disposed at one end of the circumferential wall and that does not disturb a function of the sensor, a seal lip is disposed on the circumferential wall near the protective wall, and the sleeve is inserted into the branch pipe such that the protective wall is positioned near a base end of the branch pipes.

4 Claims, 4 Drawing Sheets

(56) References Cited

U.S. PATENT DOCUMENTS

| | | | |
|---|---|---|---|
| 5,115,676 A * | 5/1992 | Lee | 73/706 |
| 5,154,453 A | 10/1992 | Nishio | |
| 5,743,572 A | 4/1998 | Nishio | |
| 5,996,636 A | 12/1999 | Fukano et al. | |
| 6,089,621 A | 7/2000 | Nishio | |
| 6,178,826 B1 * | 1/2001 | Graf et al. | 73/861.12 |
| 6,484,589 B1 * | 11/2002 | Brock | 73/861.18 |
| 6,852,216 B2 * | 2/2005 | Moscaritolo et al. | 210/85 |
| 7,194,919 B2 * | 3/2007 | Shkarlet et al. | 73/861.18 |
| 7,370,545 B2 * | 5/2008 | Uchikawa et al. | 73/866.5 |
| 7,861,608 B2 * | 1/2011 | Furey et al. | 73/866.5 |
| 8,256,076 B1 * | 9/2012 | Feller | 29/25.35 |
| 8,302,496 B2 * | 11/2012 | Furey et al. | 73/866.5 |
| 8,365,601 B2 * | 2/2013 | Minachi et al. | 73/602 |
| 8,434,361 B2 * | 5/2013 | Fink | 73/431 |
| 8,733,188 B2 * | 5/2014 | Furlong et al. | 73/866.5 |
| 2002/0144559 A1 * | 10/2002 | Bueno Harto et al. | 73/866.5 |
| 2003/0226412 A1 * | 12/2003 | Rumminger et al. | 73/866.5 |
| 2004/0079685 A1 * | 4/2004 | Moscaritolo et al. | 210/85 |
| 2004/0093957 A1 * | 5/2004 | Buess et al. | 73/861.27 |
| 2004/0149039 A1 * | 8/2004 | Cardelius | 73/570 |
| 2007/0204704 A1 * | 9/2007 | Gneuss | 73/866.5 |
| 2008/0053255 A1 * | 3/2008 | Furey et al. | 73/866.5 |
| 2008/0165828 A1 * | 7/2008 | Seki et al. | 374/208 |
| 2008/0276712 A1 * | 11/2008 | Kurtz et al. | 73/715 |
| 2010/0145636 A1 * | 6/2010 | Nyfors | 702/49 |
| 2010/0186501 A1 * | 7/2010 | Fink | 73/431 |
| 2011/0111489 A1 * | 5/2011 | Beese et al. | 435/289.1 |
| 2011/0146425 A1 * | 6/2011 | Furey et al. | 73/866.5 |
| 2011/0247431 A1 * | 10/2011 | Moldenhauer | 73/861.58 |
| 2012/0048038 A1 * | 3/2012 | Furlong et al. | 73/866.5 |
| 2012/0167688 A1 * | 7/2012 | Minachi et al. | 73/602 |
| 2013/0036844 A1 * | 2/2013 | Furey et al. | 73/866.5 |
| 2014/0069187 A1 * | 3/2014 | Ranftl et al. | 73/431 |

FOREIGN PATENT DOCUMENTS

| | | |
|---|---|---|
| JP | 9-166512 | 6/1997 |
| JP | 10-54489 | 2/1998 |
| JP | 10-267176 | 10/1998 |
| JP | 11-64048 | 3/1999 |
| JP | 11-141791 | 5/1999 |
| JP | 11-257571 | 9/1999 |
| JP | 11-257572 | 9/1999 |

OTHER PUBLICATIONS

English Translation of Nishio (JP 10-054489).*

* cited by examiner

FLUID MEASUREMENT SENSOR ATTACHMENT STRUCTURE

BACKGROUND OF THE INVENTION

1. Field of the Invention

The present invention relates to a fluid measurement sensor attachment structure. More specifically, the present invention relates to a fluid measurement sensor attachment structure with which measurements can be performed at high precision without lowering a fluid transport capacity.

2. Description of the Related Art

Various fluid measurement sensor attachment structures have been provided in order to measure properties such as the flow rate, the fluid pressure, and the transparency of a fluid passing through a pipe. Examples thereof include an attachment structure in which a sensor is disposed in one of three branch pipes of a T-joint, and the flow rate and the like of a fluid flowing through the remaining two pipes are measured. Japanese Laid-Open Patent Publication No. 9-166512 describes that a fluid pressure sensor provided with a cylindrical sensor casing that is fitted to an inner wall of a joint base end portion and that has a diaphragm on the bottom portion is proposed as a sensor for the measurement. Furthermore, Japanese Laid-Open Patent Publication No. 11-64048 describes that, as a technique for improving the sealing performance between a sensor casing and a joint main body, a fluid measurement sensor attachment structure is proposed that includes a joint main body, a cylindrical sealing member, a sensor casing accommodating a fluid measurement sensor, and a pressure ring, wherein a joint is sealed with the cylindrical sealing member by causing the pressure ring to press the cylindrical sealing member against the joint main body.

The sensor of Japanese Laid-Open Patent Publication No. 9-166512 and the attachment structure of Japanese Laid-Open Patent Publication No. 11-64048 are both premised on the assumption that the sensor is attached to an existing T-joint as shown in FIG. 7. This attachment structure uses a structure for connecting a T-joint and another pipe. Accordingly, a sensor 3 is positioned near a connecting portion C, and the sensor 3 is away from a flow path P, and, thus, the flow rate, the fluid pressure, and the like may not be accurately measured. Furthermore, since a turbulent flow occurs at the branching portion, a fluid accumulation or a pressure loss may occur, which may lower the fluid transport capacity.

It seems that the measured values become closer to accurate ones by projecting the sensor 3 to a point near the flow path P. However, the problem that the transport capacity is lowered cannot be solved by merely arranging the sensor close to the flow path because a turbulent flow occurs due to a fluid flowing into a point between the sensor 3 and a branch pipe 2a.

SUMMARY OF THE INVENTION

It is an object of the present invention to provide a fluid measurement sensor attachment structure with which measurements of a fluid flowing through a pipe can be accurately performed without lowering a fluid transport capacity.

The present invention provides a fluid measurement sensor attachment structure in which a fluid measurement sensor is attached to a branch pipe among three or more branch pipes branched from a pipe, thereby measuring properties of a fluid flowing through a flow path that is formed by remaining branch pipe, comprising a sleeve that can accommodate the fluid measurement sensor, wherein the sleeve is a member in a shape of a tumbler including a circumferential wall that is substantially cylindrical and a protective wall that is disposed at one end of the circumferential wall and that does not disturb a function of the sensor, a seal lip is disposed on the circumferential wall near the protective wall, and the sleeve is inserted into the branch pipe such that the protective wall is positioned near a base end of the branch pipes.

In one embodiment, the fluid measurement sensor attachment structure further comprising a cap member that is fitted to or screwed onto an outer end of the branch pipe into which the sleeve is inserted, wherein a spacer is interposed between the cap member and the sensor that is disposed inside the sleeve.

In one embodiment, the cap member is composed of a union nut and a pressure piece that is inserted into the sleeve and presses the spacer.

In one embodiment, a reverse-tapered inclined portion that opens wider toward the protective wall of the sleeve is disposed around the circumferential wall of the sleeve, a reverse-tapered face receiving portion that engages with the reverse-tapered inclined portion is disposed inside the branch pipe, and a reverse-tapered sealing portion is formed by pressing the reverse-tapered inclined portion against the reverse-tapered face receiving portion.

In a further embodiment, a cylindrical projecting portion is disposed on a centrifugal direction side of one of the reverse-tapered inclined portion and the tapered inclined portion, a cylinder receiving portion that engages with the cylindrical projecting portion is disposed inside the branch pipe, and a cylindrical sealing portion is formed by inserting the cylindrical projecting portion into the cylinder receiving portion.

In one embodiment, a tapered inclined portion whose diameter becomes smaller toward the protective wall of the sleeve is disposed around the circumferential wall of the sleeve, a tapered face receiving portion that engages with the tapered inclined portion is disposed inside the branch pipe, and a tapered sealing portion is formed by pressing the tapered inclined portion against the tapered face receiving portion.

The present invention provides a fluid measurement sensor attachment structure in which a sleeve accommodating a fluid measurement sensor is inserted into a branch pipe among three or more branch pipes branched from a pipe, wherein a protective wall of the sleeve is positioned near a base end of the branch pipes. Accordingly, the sensitivity of the sensor increases, and the flow rate, the fluid pressure, and the like can be accurately measured. Furthermore, since a seal lip is disposed on a circumferential wall near the protective wall, a fluid does not flow into the branch pipe in which the sensor is disposed, and, thus, neither a fluid accumulation nor a pressure loss occurs. Accordingly, the fluid transport capacity is not lowered.

Furthermore, when a cap member that can be fitted to or screwed onto the branch pipe is used, and a spacer is interposed between the cap member and the sensor, the sleeve can be prevented from being detached, and, moreover, the sensor can be prevented from being shaken because the spacer can press the sensor at appropriate pressure, and, thus, the measurement precision increases.

DESCRIPTION OF THE PREFERRED EMBODIMENT

Figure 1:
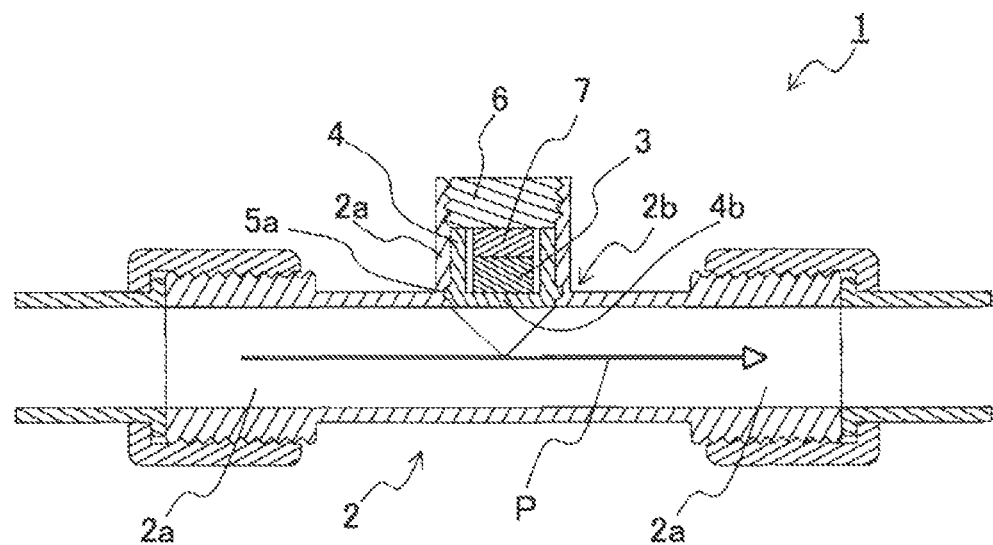
FIG. 1 is a schematic explanatory cross-sectional view showing a fluid measurement sensor attachment structure of the present invention.

As shown in FIG. 1, a fluid measurement sensor attachment structure 1 of the present invention is configured such that a fluid measurement sensor 3 (hereinafter, may be referred to simply as a "sensor 3") is attached to a branch pipe 2a among three or more branch pipes branched from a pipe 2, thereby measuring properties of a fluid flowing through a flow path P that is formed by remaining branch pipes 2a.

In the present invention, a "pipe 2 branched into three or more branch pipes" refers to a pipe in which branch pipes 2a extend from one point in three or more directions, and typically refers to a pipe in which branch pipes 2a can be respectively connected to other pipes as in a T-joint. However, there is no limitation to this, and the pipe 2 may be a pipe in which at least one of the branch pipes 2a has a shape suitable for attachment of the sensor 3 as shown in FIG. 1. Although not shown, the configuration also may be such that sensors 3 are arranged at two branch pipes among four branch pipes branched from a pipe 2 as in a cross joint, thereby measuring two or more types of properties, such as a flow rate and a transparency.

In the present invention, the remaining branch pipes 2a to which no sensor 3 is attached are connected to other pipes, and, thus, the flow path P is formed. Note that at least two of the branch pipes 2a have to be connected to other pipes in order to form the flow path P.

As a structure for connection with other pipes, all connection structures used for conventional joints and the like can be preferably used. Specific examples thereof include connection methods disclosed in Japanese Laid-Open Utility Model Publication Nos. 2-117494 and 4-132290 and Japanese Laid-Open Patent Publication Nos. 10-54489, 10-267176, 11-141791, 11-257571, and 11-257572.

The pipe 2 may be made of any resin that can be used for ordinary pipes, and specific examples thereof include fluorocarbon polymer (e.g., PTFE, PFA, and CTFF), polyethylene, polypropylene, polycarbonate, and ABS. Furthermore, the pipe 2 may be made of metals such as carbon steel, stainless steel, and aluminum, and is preferably made of stainless steel.

Figure 2:
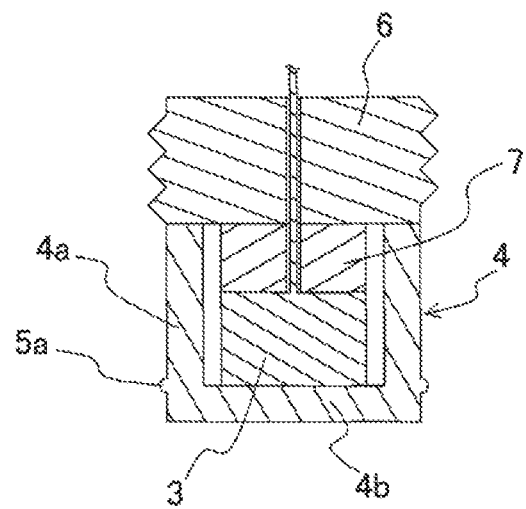
FIG. 2 is an enlarged cross-sectional view showing the vicinity of the fluid measurement sensor in FIG. 1.

The attachment structure 1 of the present invention has a sleeve 4 for accommodating the fluid measurement sensor 3, for example, as shown in FIG. 2. The sleeve 4 is in the shape of a tumbler including a circumferential wall 4a that is substantially cylindrical and a protective wall 4b that is disposed at one end of the circumferential wall 4a.

The circumferential wall 4a is a portion that faces the inner wall of the branch pipe 2a when the sleeve 4 is accommodated in the branch pipe 2a. The circumferential wall 4a is provided with a sealing structure for preventing a fluid from entering a point between the inner wall of the branch pipe 2a and the circumferential wall 4a.

In the present invention, at least a seal lip 5a is disposed on the sleeve 4 as a sealing structure. The seal lip 5a is a protrusion disposed around the circumferential wall 4a near the protective wall 4b. The cross-section of the seal lip 5a is semicircular in the example shown in FIGS. 1 and 2. However, there is no limitation to this, and, for example, the seal lip 5a may have an isosceles triangular cross-section that projects in the centrifugal direction, may project at an angle, or may project with a uniform thickness.

Recently, there is a demand for transporting, at high pressure, an extremely low viscous fluid such as a washing fluid for washing the surface of an integrated circuit. In such a situation, an additional sealing structure may be provided in order to avoid leaking out of the fluid with the seal lip 5a.

Figure 3:
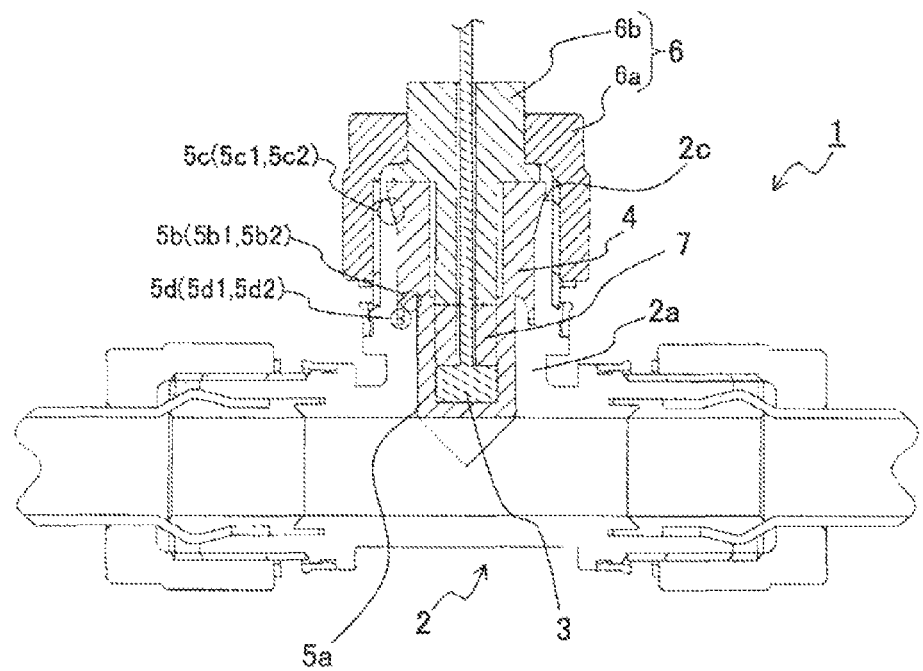
FIG. 3 is a schematic explanatory cross-sectional view showing another example of the fluid measurement sensor attachment structure of the present invention.
Figure 4A:
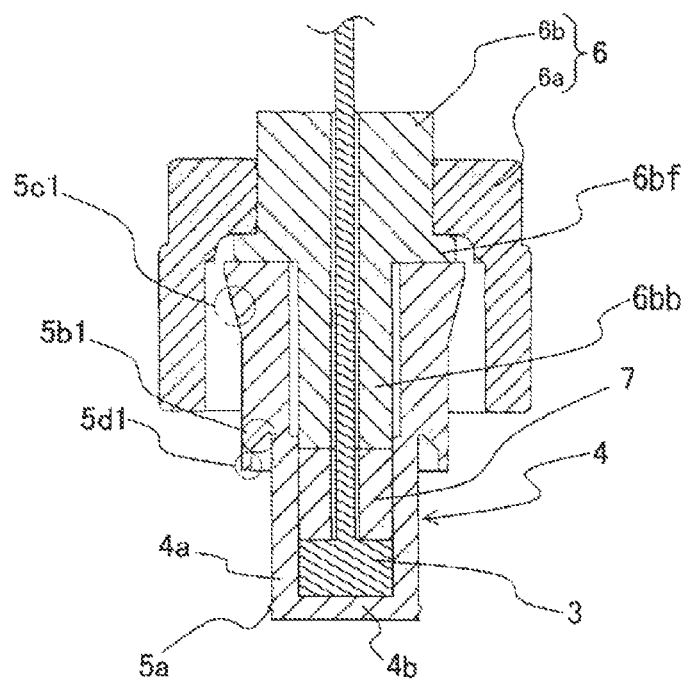
FIG. 4A is an enlarged cross-sectional view showing the vicinity of the fluid measurement sensor in FIG. 3.

For example, as shown in FIGS. 3 and 4A, a reverse-tapered inclined portion 5b1 that opens wider toward the protective wall 4b of the sleeve 4 is disposed around the circumferential wall 4a of the sleeve 4, and a reverse-tapered face receiving portion 5b2 that engages with the reverse-tapered inclined portion 5b1 is disposed inside the branch pipe 2a. A reverse-tapered sealing portion 5b is formed by pushing the sleeve 4 into the branch pipe 2a and pressing the reverse-tapered inclined portion 5b1 against the reverse-tapered face receiving portion 5b2. With the reverse-tapered sealing portion 5b, a gap between the sleeve 4 and the branch pipe 2a becomes extremely narrow due to the pressure, and a fluid hardly flows into the gap. Moreover, together with the action of the reverse-tapered sealing portion 5b, a path through which the fluid leaks out from an outer end 2c becomes long even in the case where a fluid flows into the gap, and, thus, the sealing performance is significantly improved.

Furthermore, as shown in FIGS. 3 and 4A, a tapered inclined portion 5c1 whose diameter becomes smaller toward the protective wall 4b of the sleeve 4 is disposed around the circumferential wall 4a of the sleeve 4, and a tapered face receiving portion 5c 2 that engages with the tapered inclined portion 5c1 is disposed inside the branch pipe 2a. A tapered sealing portion is formed by pushing the sleeve 4 into the branch pipe 2a and pressing the tapered inclined portion 5c1 against the tapered face receiving portion 5c 2. Contrary to the reverse-tapered sealing portion 5b, with this tapered sealing portion 5c, a path through which the fluid leaks out becomes slightly shorter. When a nut 6a is screwed down, a large pressing force is exerted, and an excellent sealing performance can be provided.

Furthermore, as shown in FIGS. 3 and 4A, a cylindrical projecting portion 5d1 is disposed in the axial direction of the sleeve 4, on the centrifugal direction side of the reverse-tapered inclined portion 5b1 or the tapered inclined portion 5c1 (the reverse-tapered inclined portion 5b1 in the example shown in the drawings), and a cylinder receiving portion 5d2 that is fitted to the cylindrical projecting portion 5d1 is disposed inside the branch pipe 2a. A cylindrical sealing portion 5d is formed by pushing the sleeve 4 into the branch pipe 2a and inserting the cylindrical projecting portion 5d1 into the cylinder receiving portion 5d2. Contrary to the reverse-tapered sealing portion 5b and the tapered sealing portion 5c, with the cylindrical sealing portion 5d, the structure on the sleeve 4 side and the structure on the branch pipe 2a side are less pressed against each other even in the case where the nut 6a is screwed down, and, thus, the effect of narrowing the gap between the sleeve 4 and the branch pipe 2a is small. However, since a large pressing force is obtained through the fitting, and the leakage path becomes complicated, the sealing performance can be significantly improved.

Figure 4B:
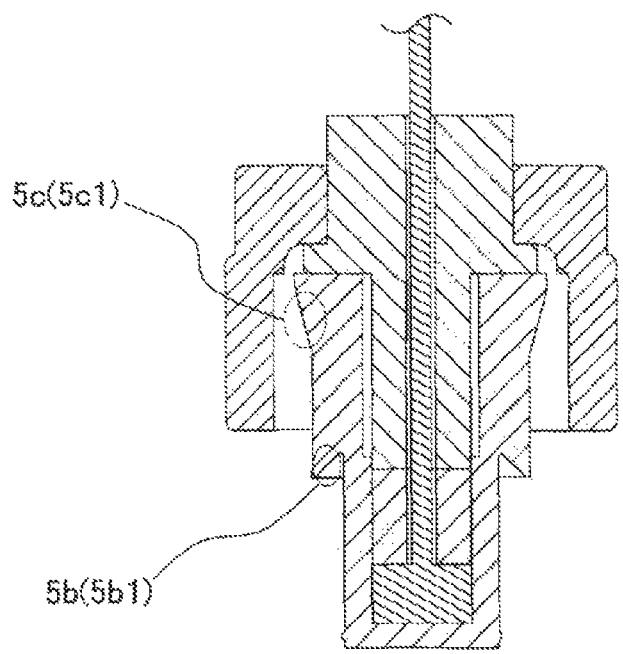
FIG. 4B is an enlarged cross-sectional view showing another example of the vicinity of the fluid measurement sensor.

Note that, although the reverse-tapered sealing portion 5b, the tapered sealing portion 5c, and the cylindrical sealing portion 5d are provided in addition to the seal lip 5a in the example shown in FIGS. 3 and 4A, all of these sealing portions do not have to be provided at the same time in the present invention. The sealing structures may be selected and provided as appropriate according to the viscosity and the transport pressure of a fluid that is to be transported. For example, depending on the use conditions, only the reverse-tapered sealing portion 5b and the tapered sealing portion 5c may be provided without forming the cylindrical sealing portion 5d as shown in FIG. 4B. Furthermore, the same type of sealing structure may be provided at two or more positions. For example, the reverse-tapered sealing portion 5b in FIGS. 3 and 4A may be changed to the tapered sealing portion 5c, that is, double tapered sealing portions 5c may be provided.

In the present invention, the protective wall 4b that does not disturb the function of the sensor 3 is disposed at one end of the sleeve 4. The protective wall 4b plays a role of preventing a fluid from flowing into the sleeve 4 and damaging the sensor 3.

The structure that does not disturb the function varies depending on the type of the sensor 3 used. For example, the protective wall 4b may be a rubber membrane or a thin resin wall if the sensor 3 is a pressure gauge, and the protective wall 4b may be provided with a window made of transparent resin if the sensor 3 is a transparency meter.

Figure 5:
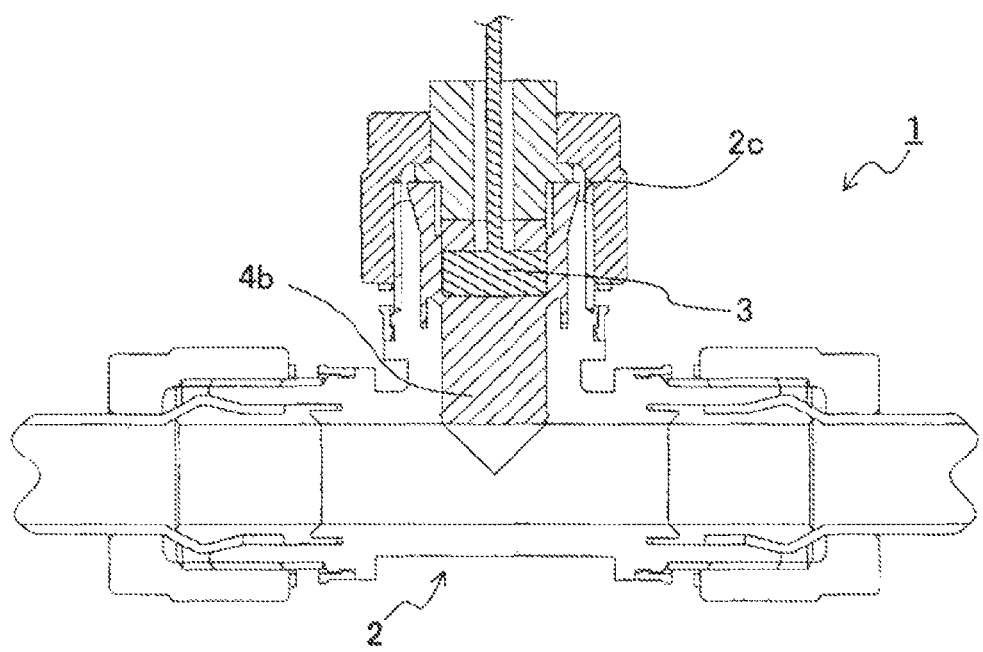
FIG. 5 is a schematic explanatory cross-sectional view showing another example of the fluid measurement sensor attachment structure.

Generally, the protective wall 4b is preferably thin in order to improve the sensitivity of the sensor 3. However, if a fluid targeted for measurement is not corrosive, a thick protective wall 4b made of polypropylene may be provided as shown in FIG. 5. In this case, the upper limit of a measurable pressure change can be relaxed, and the effect of increasing the measurement range is obtained.

In the present invention, the sleeve 4 may be made of, for example, resins such as fluorocarbon polymer (e.g., PTFE, PFA, and CTFF), polyethylene, polypropylene, polycarbonate, and ABS, as in the case of the pipe 2.

Note that the sleeve also may be made of metals such as carbon steel, stainless steel, and aluminum, and is preferably made of stainless steel. However, if the sleeve is made of metals, it may be difficult to produce the seal lip in one piece with the sleeve. In this case, the seal lip can be provided after production of the sleeve, for example, using a method in which the seal lip is separately produced and stuck to the sleeve or in which a groove having a semicircular cross-section is formed around the sleeve and an O-ring is fitted to the groove.

In the present invention, the sleeve 4 is inserted into the branch pipe 2a such that the protective wall 4b is positioned near a base end 2b of the branch pipes 2a. At that time, in order to effectively achieve the function of the seal lip 5a and to improve the sensitivity of a sensor, the configuration is preferably such that the circumferential wall of the sleeve is not exposed to the inside of the pipe, and more preferably such that the protective wall 4b is mostly flush with the inner wall of the branch pipes 2a forming the flow path P for a fluid. Accordingly, the occurrence of a turbulent flow at this portion can be suppressed to the extent possible, and the pressure loss can be reduced, and, thus, the effect of preventing a fluid transport capacity from being lowered can be obtained. Furthermore, as described above, the seal lip 5a is disposed near the protective wall 4b, and, thus, a fluid does not flow into the branch pipe 2a in which the sensor 3 is disposed, and a fluid accumulation hardly occurs. Accordingly, the use efficiency of the fluid increases.

In the present invention, a cap member 6 is attached to an outer end of the branch pipe 2a into which the sleeve 4 is inserted, and, thus, the sleeve 4 can be prevented from being detached. There is no particular limitation on the shape and the structure of the cap member 6 as long as the cap member 6 can press one end of the sleeve 4. For example, the cap member 6 may be shaped so as to be inserted into the inside of the branch pipe 2a as shown in FIG. 1, or so as to be attached to the outside of the branch pipe 2a as shown in FIG. 3. Furthermore, although the cap member 6 is screwed onto the branch pipe in both examples shown in FIGS. 1 and 3, there is no limitation to this, and the cap member 6 may be fitted to the branch pipe.

A spacer 7 may be interposed between the cap member 6 and the sensor 3 that is disposed inside the sleeve 4. Accordingly, the sensor 3 can be pressed toward the inner side of the sleeve 4 at appropriate pressure, and the sensor 3 can be prevented from being shaken, and, thus, the measurement precision can be improved. Moreover, the sealing function can be exerted. The spacer 7 is preferably made of low-resilience materials such as resin foams (e.g., PTFE foam and polyurethane foam) and low-resilience rubbers (e.g., NBR and silicone rubber).

There is no particular limitation on the shape and the size of the spacer 7 as long as the spacer 7 can be accommodated inside the sleeve 4 and transfer the pressure of the cap member 6 to the sensor 3. For example, the spacer 7 may be in the shape of a column as the simplest shape. Furthermore, if the sensor 3 is operated by an external power source or communicates with an external device via a wire, the spacer 7 may be provided with a through-hole or groove that allows a power cord or a data communication line to pass.

If the distance from the outer end 2c of the branch pipe 2a to the sensor 3 is relatively long as in a conventional T-joint, a cap member 6 that includes a union nut 6a and a pressure piece 6b as shown in FIGS. 3 and 4A may be used.

As the union nut 6a, a nut conventional used to connect a T-joint and another pipe may be used. However, there is no limitation to this, and, for example, cap nuts also may be used.

The pressure piece 6b is a member that is inserted into the sleeve 4 and presses the spacer 7, and includes a flange portion 6bf that is held between the outer end 2c of the branch pipe 2a or the outer end of the sleeve 4 and the union nut 6a and a bar portion 6bb that is inserted into the sleeve 4 (FIG. 4A).

In the present invention, the cap member 6 may be made of, for example, resins such as fluorocarbon polymer (e.g., PTFE, PFA, and CTFF), polyethylene, polypropylene, polycarbonate, and ABS, as in the case of the pipe. Furthermore, the cap member 6 may be made of metals such as carbon steel, stainless steel, and aluminum, and is preferably made of stainless steel.

Hereinafter, a flow meter M in which the fluid measurement sensors 3 are attached using the attachment structure of the present invention to a pipe having a U-shaped flow path will be described with reference to FIG. 6.

Figure 6:
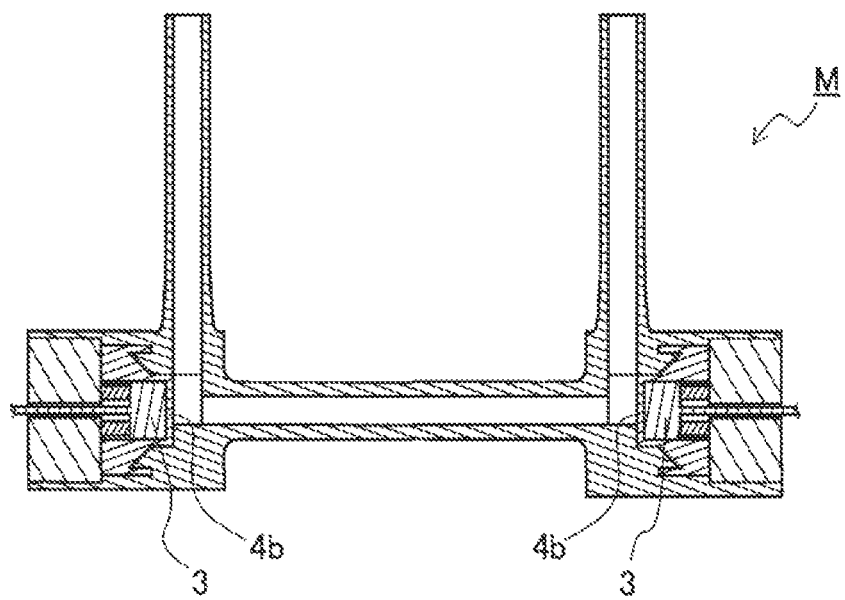
FIG. 6 is a schematic explanatory cross-sectional view showing another example of the fluid measurement sensor attachment structure.
Figure 7:
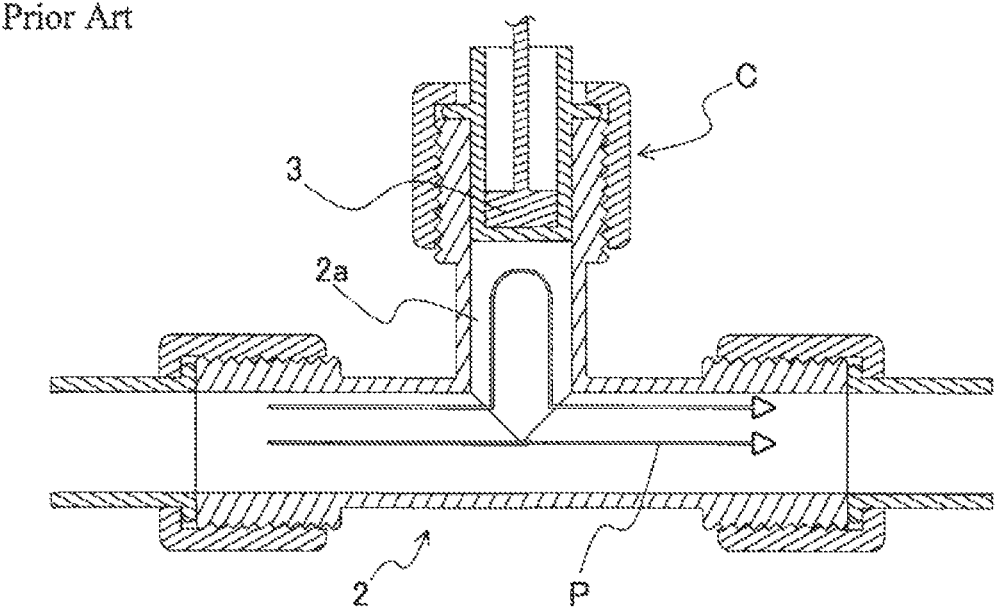
FIG. 7 is a schematic explanatory cross-sectional view showing a conventional fluid measurement sensor attachment structure.

The flow meter M of FIG. 6 uses a pipe that is branched in three directions at two points. Each of the fluid measurement sensors 3 is disposed to one of the branch pipes 2a at each branching portion. The flow path P is bent at a right angle at the branching portions, that is, the portions where the sensors 3 are arranged. In this case, the sensors 3 may be pressure gauges, and arranged parallel to the fluid flow direction between the sensors 3 (such that the protective wall 4b is oriented perpendicular to the flow direction), thereby measuring the pressure at the front side and the rear side of the fluid, or the sensors 3 may be an ultrasonic wave transmitting device and an ultrasonic wave receiving device, thereby measuring the propagation time of ultrasonic waves. The flow meter M is configured such that the flow rate can be calculated from the measured values obtained by the sensors 3.

In the fluid measurement sensor attachment structure of the present invention, a fluid measurement sensor is disposed inside a sleeve in the shape of a tumbler, the sleeve is inserted into one of three or more branch pipes branched from a pipe, a protective wall (bottom portion of the tumbler shape) of the sleeve is positioned mostly flush with the outer wall of the flow path used for measurement, and a seal lip is provided in order to prevent a fluid from flowing into the branch pipe in which the sleeve is disposed. Thus, this structure is used in the field of fluid transport using pipes, and useful particularly in the field where the flow rate and the like of a fluid being transported have to be measured.

What is claimed is:

1. A fluid measurement sensor attachment structure in which a fluid measurement sensor is attached to a branch pipe among three or more branch pipes branched from a pipe, thereby measuring properties of a fluid flowing through a flow path that is formed by remaining branch pipe,
comprising the fluid measurement sensor, a sleeve that accommodates the fluid measurement sensor, and a cap member that is fitted to or screwed onto an outer end of the branch pipe into which the sleeve is inserted,
wherein the sleeve includes a member including a circumferential wall that is substantially cylindrical and a protective wall that is disposed at one end of the circumferential wall and that is in contact with the sensor and wherein the fluid and the sensor are separated by protective wall so that the protective wall plays a role of preventing the fluid from flowing into the sleeve and damaging the sensor,
a seal lip is disposed on the circumferential wall near the protective wall, and
the sleeve is inserted into the branch pipe such that the protective wall is positioned near a base end of the branch pipes,
wherein a spacer is interposed between the cap member and the sensor that is disposed inside the sleeve,
wherein the cap member is composed of a union nut and a pressure piece that is inserted into the sleeve and presses the spacer,
wherein a reverse-tapered inclined portion whose diameter increases toward the protective wall of the sleeve is disposed around the circumferential wall of the sleeve,
a reverse-tapered face receiving portion that engages with the reverse-tapered inclined portion is disposed inside the branch pipe, and
a reverse-tapered sealing portion is formed by pressing the reverse-tapered inclined portion against the reverse-tapered face receiving portion,
wherein a cylindrical projecting portion is disposed on a centrifugal direction side of the reverse-tapered inclined portion and is projected toward the protective wall of the sleeve,
a cylinder receiving portion that engages with the cylindrical projecting portion is disposed inside the branch pipe, and
a cylindrical sealing portion is formed by inserting the cylindrical projecting portion into the cylinder receiving portion,
wherein an angle formed between the reverse-tapered inclined portion and an inner surface of the cylindrical projection portion is an obtuse angle.

2. The fluid measurement sensor attachment structure of claim 1, wherein the sleeve and the cap member are made of a material selected from the group consisting of fluorocarbon polymer, polyethylene, polycarbonate, and ABS.

3. The fluid measurement sensor attachment structure of claim 1, wherein the spacer is made of a material selected from the group consisting of PTFE foam, polyurethane foam, NBR and silicone rubber.

4. The fluid measurement sensor attachment structure of claim 1, wherein the seal lip, the circumferential wall and the protective wall are integrally shaped.

\* \* \* \* \*